United States Patent
Chiang et al.

(10) Patent No.: US 9,411,602 B2
(45) Date of Patent: Aug. 9, 2016

(54) TECHNIQUES FOR BOOTING AN INFORMATION PROCESSING SYSTEM

(71) Applicant: LENOVO ENTERPRISE SOLUTIONS (SINGAPORE) PTE. LTD., Singapore (SG)

(72) Inventors: Jim FC Chiang, New Taipei (TW); Hank CH Chuang, New Taipei (TW); Liwei LW Lin, New Taipei (TW); Hsuan-Chiang Wang, New Taipei (TW)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 149 days.

(21) Appl. No.: 14/301,176

(22) Filed: Jun. 10, 2014

(65) Prior Publication Data
US 2014/0365758 A1 Dec. 11, 2014

(30) Foreign Application Priority Data
Jun. 11, 2013 (TW) .............................. 102120654 A (51) Int. Cl.
G06F 15/177 (2006.01)
G06F 9/44 (2006.01)

(52) U.S. Cl.
CPC .................................. *G06F 9/4401* (2013.01)

(58) Field of Classification Search
CPC .......... G06F 15/177; H04N 7/16; H04L 9/00; H04L 9/32
USPC ........................................................ 713/1, 2
See application file for complete search history.

(56) References Cited

U.S. PATENT DOCUMENTS

| | | | | |
|---|---|---|---|---|
| 2005/0177710 A1* | 8/2005 | Rothman | ............ | G06F 9/44505 713/2 |
| 2006/0184794 A1* | 8/2006 | Desselle | ............... | G06F 21/575 713/166 |
| 2006/0236085 A1* | 10/2006 | Norton | .................. | G06F 9/4406 713/2 |
| 2007/0143590 A1* | 6/2007 | Lee | ........................ | G06F 9/4406 713/2 |
| 2007/0150716 A1* | 6/2007 | Lee | ........................ | G06F 9/4408 713/2 |
| 2008/0209202 A1* | 8/2008 | Kawahara | ............... | G06F 9/445 713/2 |
| 2012/0117370 A1 | 5/2012 | Saretto et al. | | |
| 2012/0166780 A1* | 6/2012 | Ziarnik | .................. | G06F 9/4401 713/1 |

FOREIGN PATENT DOCUMENTS

TW 200725401 7/2007

OTHER PUBLICATIONS

Remote Boot to Setup (Author: IBM; Source: IPCOM000126977D, Aug. 16, 2005; Publisher: IP.com).

* cited by examiner

*Primary Examiner* — Vincent Tran
(74) *Attorney, Agent, or Firm* — Edward J. Lenart; Katherine S. Brown; Kennedy Lenart Spraggins LLP (57) ABSTRACT

A technique for booting an information processing system includes storing a boot sequence table in a storage unit. The boot sequence table includes a specific boot sequence defining a boot sequence of a setup utility and a bootable subject during booting. The boot sequence table is accessed via the operating system firmware interface. A subject to be booted is determined in accordance with the boot sequence.

10 Claims, 4 Drawing Sheets

TECHNIQUES FOR BOOTING AN INFORMATION PROCESSING SYSTEM

This application claims priority to Taiwanese Patent Application 102120654, entitled "METHOD, APPARATUS, AND COMPUTER PROGRAM PRODUCT FOR BOOTING AN INFORMATION PROCESSING SYSTEM," filed on Jun. 11, 2013. The disclosure of Taiwanese Patent Application 102120654 is hereby incorporated herein by reference in its entirety for all purposes.

BACKGROUND

The disclosure relates to an information processing system and, more specifically, to techniques for booting an information processing system.

Computer systems are in wide use in various areas nowadays to enable robust computation. A typical computer system (i.e., an information processing system) has a central processing unit (CPU) and related volatile/non-volatile memory, including a random access memory (RAM) and a read-only memory (ROM), such as a flash memory, with a basic input/output system (BIOS). The electrical coupling of the aforesaid components and the like is achieved by a motherboard or any other appropriate means.

During a boot of an information processing system, BIOS routines usually initialize hardware, test hardware functions, and guide the actions of an operating system. BIOS routines are always executed as soon as a boot begins. Unless BIOS routines are executed full and well, some hardware components will not function well and thus will require troubleshooting before they can continue with their operation. Conventionally, a BIOS setup utility serves to set the configuration and functions of the system and the values set by BIOS setup utility are then stored in a CMOS chip to provide reference for use in system configuration analysis and testing. Furthermore, BIOS service routines come in the form of commonly known BIOS interruption service routines and most hardware access operations are performed by the BIOS interruption service.

Conventionally, BIOS parameters are usually set and changed by executing a BIOS setup utility in the BIOS chip and the execution of BIOS setup utility begins as soon as a user presses one or more related function keys. To enter a BIOS setup utility, the user has to wait for a while first and then press related function keys to begin performing various setting processes (boot sequencing, performance tuning, etc.) as soon as a prompt message (e.g., "press function key to enter BIOS Setup") pops into view. However, the display of the prompt message may last for only several seconds. If the user misses the prompt message, the user will have to reboot the system in order to enter the BIOS setup utility again.

In an attempt to change the BIOS settings, which might require a large number of instances of reboot, the user is likely to omit pressing or forget to press some function keys during a boot (e.g., the user may not press some function keys because the user leaves the scene before the boot is done).

If the system cannot be booted in accordance with a predefined boot path for a specific reason (for example, hard disk drive 0, which is booted first, ends up in a failure), the user can only discover that the screen shows simple text or images descriptive of the related failure, but the user still has to reboot BIOS setup utility in order to dig into its actual details and situation.

In fact, according to the conventional art, the user often has to anticipate a prompt message and wait for the time to press function keys before the expected entry into BIOS setup occurs. The aforesaid problems may necessitate a large number of instances of rebooting a BIOS setup utility, cause a waste of time, bring inconvenience to users, and mainly account for low efficiency.

BRIEF SUMMARY

A technique for booting an information processing system includes storing a boot sequence table in a storage unit. The boot sequence table includes a specific boot sequence defining a boot sequence of a setup utility and a bootable subject during booting. The boot sequence table is accessed via the operating system firmware interface. A subject to be booted is determined in accordance with the boot sequence.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, an apparatus, and a computer program product for retrieval of an image having high similarity to an acquired image, from among a plurality of stored images.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be used herein, the term 'coupled' may encompass a direct connection between components or elements or an indirect connection between components or elements utilizing one or more intervening components or elements.

The disclosure provides an information processing system booting technique which is user-friendly and conducive to great reduction in the number of instances of rebooting s BIOS setup utility.

The disclosure provides, in an illustrative embodiment thereof, a method for booting an information processing system. The information processing system comprises a central processing unit (CPU) or processor, a storage unit, and at least a bootable subject. The bootable subject is electrically coupled to the CPU and the storage unit. The storage unit includes an operating system firmware interface and a setup utility. The method comprises: storing a boot sequence table in the storage unit, wherein the boot sequence table includes a specific boot sequence defining a boot sequence of the setup utility and the at least a bootable subject during booting; accessing, by the CPU, the boot sequence table via the operating system firmware interface; and determining, by the CPU, a subject to be booted in accordance with the boot sequence.

The method may further comprise: determining whether the subject to be booted is the setup utility; starting the setup utility in response to the determining that the subject is the setup utility; and starting the bootable subject in response to the determining that the subject is not the setup utility.

The method may further comprise: storing a setup utility timer value table in the storage unit, wherein the setup utility timer value includes a specific time value; and accessing, by the CPU, the setup utility timer value table via the operating system firmware interface.

The method may further comprise keeping the information processing system idle and waiting for an input from at least a human interface apparatus in response to the accessed specific time value being zero.

The method may further comprise: determining whether there is not any input from the at least a human interface apparatus within a specific time period of the value in response to the accessed specific time value being not zero; keeping the information processing system idle and waiting for an input from the at least a human interface apparatus in response to presence of an input from the at least a human interface apparatus; and determining whether the booted subject is the setup utility in response to absence of an input from the at least a human interface apparatus.

The method may further comprise accessing, by the CPU, an instruction from the operating system firmware interface to boot an operating system, The operating system firmware interface may include a basic input/output system (BIOS), a universal extensible firmware interface (UEFI), or an extensible firmware interface (EFI). The bootable subject may comprise a hard disk drive 0, a hard disk drive 1, a preboot execution environment (PXE) network booting, a compact disc/digital versatile disk (CD/DVD), a universal serial bus (USB) memory device, and an Internet small computer system interface (iSCSI) memory device.

The disclosure provides, in another illustrative embodiment, a computer program product having a computer-readable program stored on a computer-readable storage device. When executed by an information processing system, the computer-readable program enables the information processing system to implement the previously described method, operations, and a combination thereof as described in the illustrative embodiments.

The disclosure provides, in yet another illustrative embodiment thereof, an apparatus for booting an information processing system. The apparatus comprises: a CPU; a storage unit electrically coupled to the CPU and comprising an operating system firmware interface and a setup utility; at least a bootable subject electrically coupled to the CPU and the storage unit; and a boot sequence table stored in the storage unit. The boot sequence table includes a specific boot sequence defining a boot sequence of the setup utility and the bootable subject during booting. The CPU accesses the boot sequence table via the operating system firmware interface and determines a subject to be booted in accordance with the boot sequence table.

Figure 1:
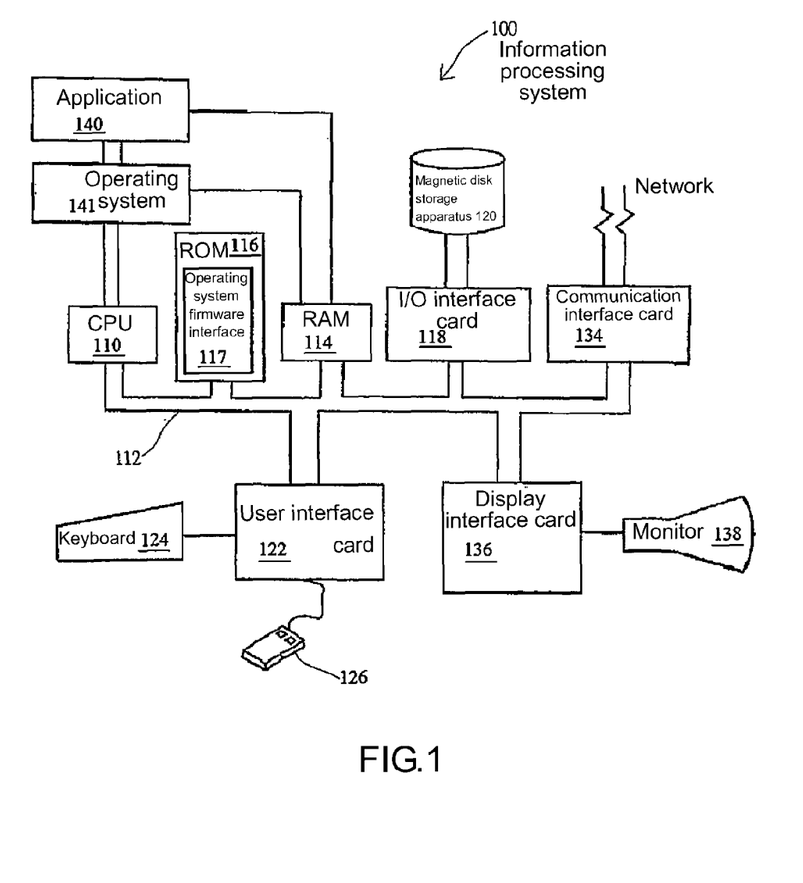
FIG. 1 is a schematic view of an information processing system according to an embodiment of the present disclosure.

Referring to FIG. 1, there is shown a schematic view of the hardware framework of an information processing system 100 according to an embodiment of the present disclosure. The information processing system 100 comprises a central processing unit (CPU) or processor 110 connected to other components by a system bus 112. An operating system 141 run on the CPU 110 is executable to control and coordinate the functioning of the components shown in FIG. 1. The operating system 141, which is commercially available, can be exemplified by Microsoft™ Windows™ (wherein Microsoft™ and Windows are are trademarks owned by Microsoft and registered in the United States and/or other countries), UNIX, and. AIX.

Under the control of the operating system 141, applications 140 move into and move out of a main memory 114 (including but not limited to a random access memory, RAM). A storage apparatus 116 (including but not limited to a read-only memory, ROM) is connected to the CPU 110 by the system bus 112. The ROM 116 comprises an operating system firmware interface 117 which controls basic computer functions. The RAM 114, an I/O interface card 118, and a communication interface card 134 are connected directly to the system bus 112. The I/O interface card 118 is connected to a computer system interface card of a magnetic disk storage apparatus 120 (including but not limited to a hard disk drive). The communication interface card 134 enables the system bus 112, to be connected to an external network, and enables the information processing system 100 to communicate with another system.

The information processing system 100 receives data from another system and sends data to another system via a network (such as the Internet). Basic input apparatuses, such as a mouse 126 and a keyboard 124, are connected to the system bus 112 via a user interface card 122. A display interface card 136 displays images on a monitor 138. The monitor 138 includes, but is not limited to, a liquid crystal panel or a touch panel. A user operates or clicks on the information processing system 100 with an input apparatus, such as a mouse or a keyboard.

Figure 2:
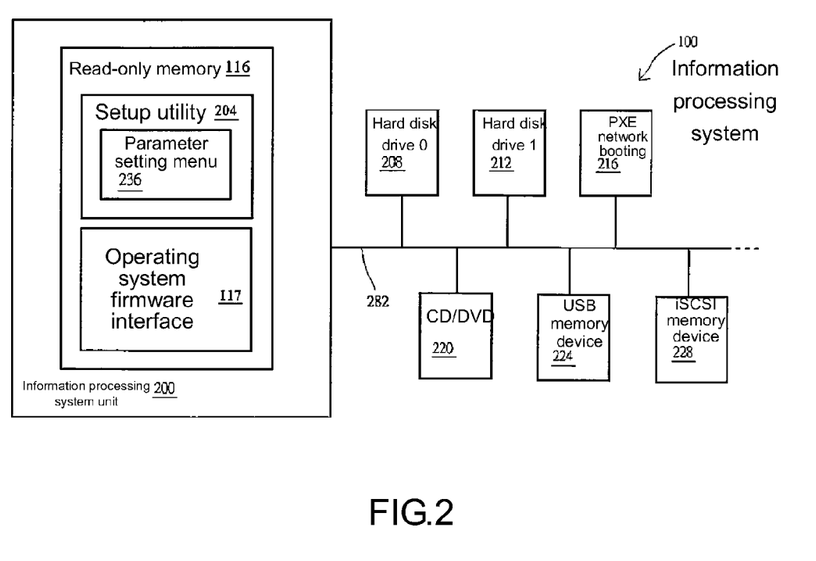
FIG. 2 is a schematic block diagram of the information processing system according to one embodiment of the present disclosure.

Referring to FIG. 2, a schematic block diagram of a read-only memory (ROM) 116 (including but not limited to a flash memory) and other components of the information processing system 100 shown in FIG. 1 are further illustrated. The ROM 116 is disposed in an information processing system unit 200 of the information processing system 100. A hard disk drive 0 (Hard Disk 0) 208, a hard disk drive 1 212, a preboot execution environment (PXE) network booting 216 (that is, preboot execution environment booting is a network-based booting technique which entails booting by means of a network jack of a motherboard, for example), a CD/DVD 220, a USB memory device 224, and an iSCSI memory device 228 are connected to the information processing system unit 200 via a bus 282. Each of the components described above with reference to FIG. 2 are well known to persons skilled in the art and, as such, are not described further herein for the sake of brevity. Details of components of the information processing system 100 and operation thereof are further described below.

In an embodiment, the ROM 116 includes the operating system firmware interface 117. The operating system firmware interface 117 includes a BIOS, an EFI, a UEFI an may include other interfaces. The ROM 116 further includes a setup utility 204 for setting configuration, functions and the authority of the information processing system 100.

In various embodiments, taking the BIOS 117 as an example, an instruction required for a standard boot procedure of the information processing system 100 is recorded by a routine. As soon as the power supply of the information processing system 100 starts, the CPU 110 executes a boot in accordance with a booting procedure instruction recorded in the BIOS 117, including but not limited to testing automatically hardware components on the motherboard (not shown), determining whether the CPU 110, the ROM 116, and the RAM 114 are functioning well, searching for the operating system 141 and booting it, and handing the information processing system 100 hardware over to the operating system 141 for a boot, management, and control.

The BIOS 117 is an initial routine for booting a system as soon as power is supplied thereto. The BIOS 117 also pre-boots the operating system 141 and connects a data stream between apparatuses (such as the hard disk drive 120, the keyboard 124, the mouse 126, and the display interface card 136). As soon as the system power supply starts, the BIOS 117 performs default value setting and boots a Power-on Self Test (POST).

UEFI resulted from concerted efforts made by industrialists to enhance and improve the booting procedure. In short, UEFI is about an interface rule which sets forth an architecture-oriented independent mechanism for an interface between an operating system and a platform firmware during a boot and supports initialization of add-on cards (such as expansion cards, and adapter cards.) UEFI circumvents intrinsic limitations on a BIOS, manifests optimal expandability, enables new components to be created by a standard programming language tool, supports C language programming, and renders programs easy to maintain.

In general, the operating system firmware interface 117 (including but not limited to BIOS and UEFI) is built in the motherboard of a computer system to control a setting interface for use in basic hardware operation. To adjust an apparatus selected during a boot of the information processing system 100 or after installing a new apparatus on the information processing system 100, the user performs related setting on the operating system firmware interface 117, for example, parameter setting of the operating system firmware interface 117. Take the BIOS 117 as an example, to adjust the sequence of an apparatus (such as a drive) selected during a boot of the information processing system 100 or after installing a new apparatus (such as a drive) on a computer system, the user changes parameters of the BIOS 117. A typical way of changing BIOS parameters entails executing the setup utility 204 of the BIOS in the ROM 116.

BIOS parameters are stored in the ROM 116, but the present invention is not limited thereto. The BIOS parameters include information pertaining to a system CPU, a floppy drive driver, a hard disk drive driver, a monitor, and a keyboard. Typically, BIOS parameter setting is required for testing or delivering the information processing system 100 or adding a component thereto. After it has been shut down, a standby battery (not shown) supplies power to the ROM 116 of the information processing system 100 to enable retention of data stored therein.

In an embodiment, the setup utility 204 includes but is not limited to a parameter setting interface. The operating frame of the parameter setting interface is displayed by the monitor 138, such that the user can adjust and set the parameters (including but not limited to BIOS parameters) of the parameter setting interface. The CPU 110 is electrically coupled to the monitor 138 and the ROM 116 and adapted to execute the operating system firmware interface 117, call the parameter setting interface, and display the parameter setting interface on the monitor 138. Take the BIOS 117 as an example, to enable BIOS parameter setting to be performed, the monitor 138 typically displays a parameter setting interface or setting window of a graphic user interface, but the present invention is not limited thereto. A parameter setting interface or menu 236 displays setting options, such as system standard parameter setting, chip parameter setting, BIOS parameter setting, loading BIOS default value, selecting loading optimal setting value, user password setting, and power management setting, (but the present invention is not limited thereto), such that the user can perform switching and setting by clicking on the setting options or through an input apparatus, such as a mouse or a keyboard.

In one embodiment, the setup utility 204 includes the parameter setting menu 236. The parameter setting menu 236 includes a plurality of setting options, such that the user adjusts and sets parameter values of the setting options for executing the operating system firmware interface 117 by parameter setting items of the parameter setting menu 236.

Figure 3:
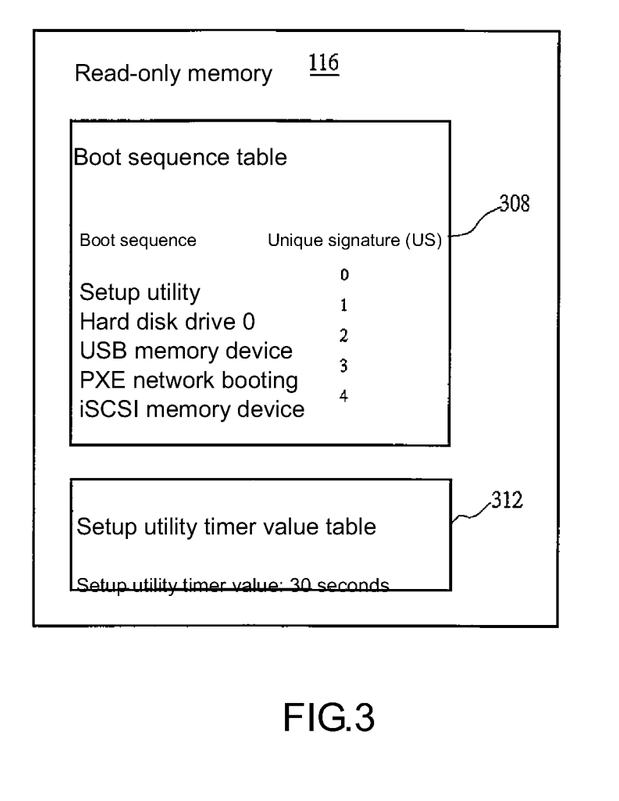
FIG. 3 is a schematic block diagram of a ROM according to an embodiment of the present disclosure.

Referring to FIG. 3, in an embodiment, the ROM 116 further stores a boot sequence table 308 which illustrates the boot sequence of apparatuses connected, the setup utility 204 (that is, treating the setup utility 204 as a bootable subject), and their unique signatures. The setup utility 204 is allocated to whatever sequence and position in the boot sequence table 308 in accordance with the user's setting. Referring again to FIG. 3, the boot sequence begins with the setup utility 204, which is followed by the hard disk drive 0 208, USB memory device 224, PXE network booting 216, and iSCSI memory device 228. In this case, the setup utility 204 has a unique signature of 0, the hard disk drive 0 208 has a unique signature of 1, USB memory device 224 has a unique signature of 2, PXE network booting 216 has a unique signature of 3, and iSCSI memory device 228 has a unique signature of 4. The setup utility 204 may be allocated to whatever position in the boot sequence as needed.

The ROM 116 further stores a setup utility timer value table 312 that includes a setup utility timer value essentially defined as: within the setup utility timer value, if a human interface device (HID) does not send any input, the setup utility 204 will execute an operation, for example, by means of the boot sequence table 308, to determine whether there is any next bootable subject to be booted. Depending on the user's setting, the setup utility timer value determined includes but is not limited to 0 to 60 seconds and is set to 30 seconds in one embodiment, but the present invention is not limited thereto. Details of the boot sequence table 308 and the setup utility timer value table 312 and operation are further described below.

Figure 4:
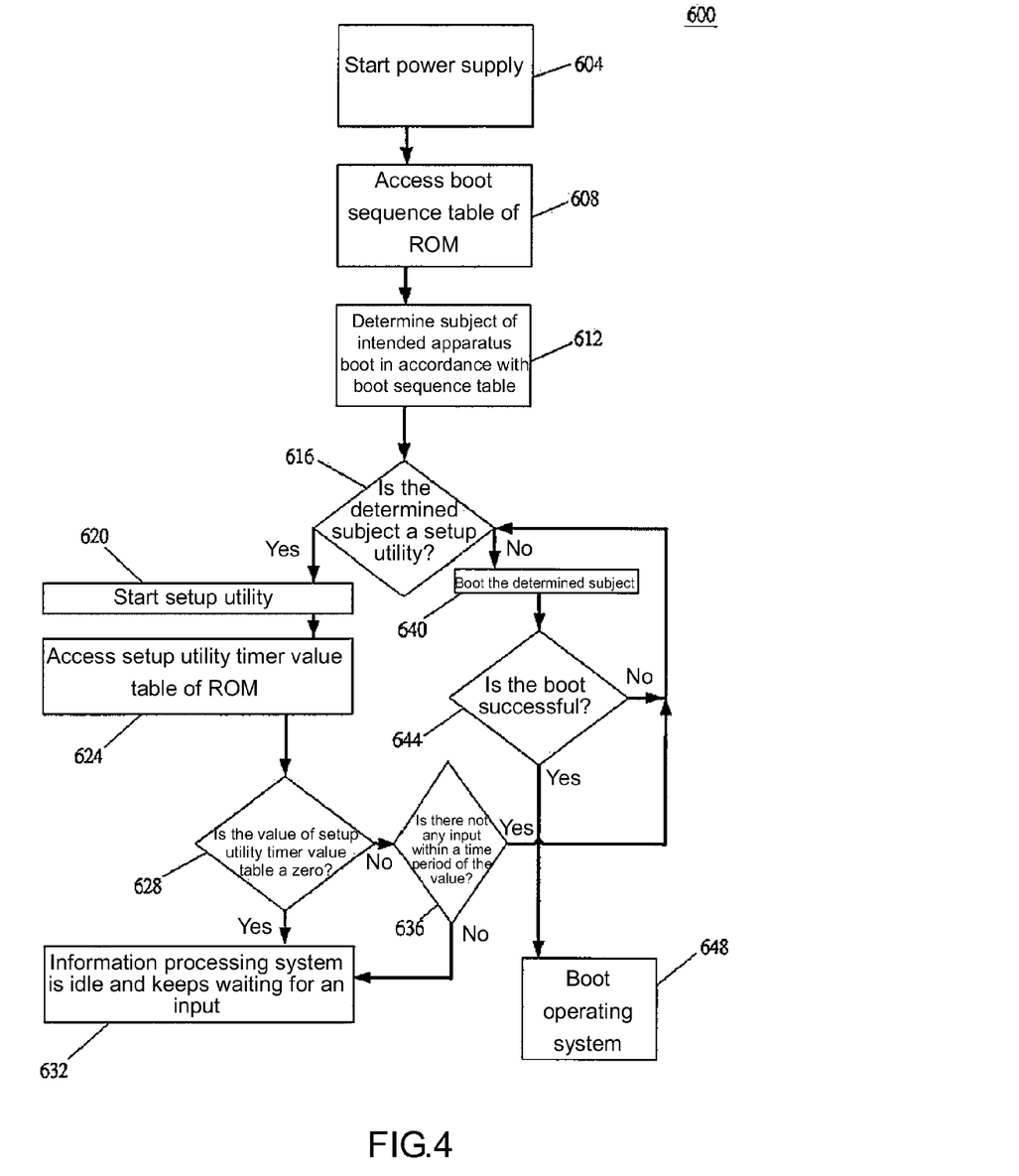
FIG. 4 is a flow chart of a booting method according to an embodiment of the present disclosure.

Referring to FIG. 4, a process for booting the information processing system 100 shown in FIG. 1 through FIG. 3 according to an embodiment is illustrated. As shown in FIG. 4, a process 600 for booting the information processing system includes a number of blocks. In block 604 a power supply (not shown) is started. Next, in block 608, the CPU 110 accesses the boot sequence table 308 of the ROM 116 via the operating system firmware interface 117. Then, in block 612, the CPU 110 determines the subject of the intended apparatus boot in accordance with the boot sequence table 308. Next, in decision block 616, the CPU 110 determines whether the determined subject is a setup utility in accordance with the boot sequence table 308.

If the CPU 110 determines that the determined subject is a setup utility, control transfers from block 616 to block 620. In block 620 the CPU 110 starts the setup utility 204. Next, in block 624, the CPU 110 accesses the setup utility timer value table 312 of the ROM 116 via the operating system firmware interface 117. Then, in decision block 628, the CPU 110 determines whether the value of the setup utility timer value table 312 is zero. If the value is zero in block 628, control transfers to block 632, In block 632, the information processing system 100 is idle and keeps waiting for a signal/input from at least a human interface apparatus.

If the value is not zero in block 628, control transfers to block 636. In block 636, the CPU 110 determines whether there is not any signal/input from the at least a human interface apparatus within a specific time period of the value of the setup utility timer value table 312. If the determination is affirmative, control transfers from block 636 to block 616, where further processing is initiated on the next subject in the boot sequence table 308. If the determination is negative (i.e., there is a signal/input (including but not limited to pressing one or more function keys manually) from at least a human interface apparatus within a specific time period of the value of the setup utility timer value table 312) control transfers from block 636 to block 632 (i.e., the information processing system 100 is idle and waits for an input from the at least a human interface apparatus.

If the CPU 110 determines that the determined subject is not a setup utility in block 616, control transfers from block 616 to block 640. In block 640 the CPU 110 boots a subject determined not to be the setup utility 204. Next, in decision block 644, the CPU 110 determines whether the boot is successful. The process flow of the process 600 transfers to block 648 if the boot is successful. If the boot is unsuccessful, control transfers to block 616, where the process is continued on the next subject in the boot sequence table 308. If the boot is successful in block 644 control transfers to block 648, where the CPU 110 boots the operating system 141.

Subsequently, for example, a typical system operates or enters a standby state. For more information about the other basic architecture and components of the information processing system 100, reference can be made to typical personal computers or servers, such as IBM's System X, Blade Center or eServer. Details irrelevant to the present invention are not described herein for the sake of brevity.

According to embodiments of the present disclosure, no user will fail to press function keys or enter a BIOS setup utility just because the user misses a prompt message. Furthermore, in case a boot failure happens to any apparatus, the system will enter a setup utility to examine the details of the failure conveniently in accordance with the user's configuration of the boot path. In the aforesaid embodiment, the operating system firmware interface is explained from the perspective of the BIOS; however, persons skilled in the art are able to infer easily additional situations, including but not limited to UEFI and EFI, but the present invention is not limited thereto. Furthermore, in the embodiment illustrated with FIG. 4, the boot sequence table 308 illustrates a boot sequence: setup utility 204, hard disk drive 0 208, USB memory device 224, PXE network booting 216, and iSCSI memory device 228; however, persons skilled in the art are able to readily infer additional apparatuses, situations, and combinations, as appropriate, wherein the setup utility 204 can be allocated to another position in the sequence, but the present invention is not limited thereto.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method comprising:
by computer program instructions on a computing device,
storing a boot sequence table in the storage unit, wherein the boot sequence table includes a specific boot sequence defining a boot sequence of the setup utility and the bootable subject during booting;
starting a setup utility in response to the determining that the subject to be booted, in accordance with the boot sequence, is the setup utility;
starting a setup utility timer value countdown from a specific value; and
determining whether an input is received from a human interface apparatus before the setup utility value completes the countdown;
if no input is received from the human interface apparatus before the setup utility value completes the countdown, restarting the setup utility; and
if an input is received from the human interface apparatus before the setup utility value completes the countdown, keeping the information processing system idle and waiting for an additional input from the human interface apparatus.

2. The method of claim 1, further comprising:
accessing the setup utility timer value table via the operating system firmware interface.

3. The method of claim 1, wherein the operating system firmware interface comprises one of a basic input/output system (BIOS), a universal extensible firmware interface (UEFI), and an extensible firmware interface (EFI).

4. The method of claim 1, further comprising accessing an instruction from the operating system firmware interface to boot an operating system.

5. The method of claim 1, wherein the bootable subject comprises at least one of a hard disk drive 0, a hard disk drive 1, a preboot execution environment (PXE) network booting, a compact disc/digital versatile disk (CD/DVD), a universal serial bus (USB) memory device, and an Internet small computer system interface (iSCSI) memory device.

6. An apparatus for booting an information processing system, the information processing system comprising:
  a processor;
  a storage unit electrically coupled to the processor and including an operating system firmware interface and a setup utility; wherein the storage unit includes computer program instructions that when executed by the processor cause the apparatus to:
    store a boot sequence table in the storage unit, wherein the boot sequence table includes a specific boot sequence defining a boot sequence of the setup utility and the bootable subject during booting;
    start a setup utility in response to the determining that the subject to be booted, in accordance with the boot sequence, is the setup utility;
    start a setup utility timer value countdown from a specific value; and
    determining whether an input is received from a human interface apparatus before the setup utility value completes the countdown;
    if no input is received from the human interface apparatus before the setup utility value completes the countdown, restart the setup utility; and
    if an input is received from the human interface apparatus before the setup utility value completes the countdown, keep the information processing system idle and waiting for an additional input from the human interface apparatus.

7. The apparatus of claim 6, wherein the processor accesses the setup utility timer value table via an operating system firmware interface.

8. The apparatus of claim 6, wherein the operating system firmware interface comprises one of a basic input/output system (BIOS), a universal extensible firmware interface (UEFI), and an extensible firmware interface (EFI) and the bootable subject comprises at least one of a hard disk drive 0, a hard disk drive 1, a preboot execution environment (PXE) network hooting, a compact disc/digital versatile disk (CD/DVD), a universal serial bus (USB) memory device, and an Internet small computer system interface (iSCSI) memory device.

9. The apparatus of claim 6, wherein the processor accesses an instruction from the operating system firmware interface to boot an operating system.

10. A computer program product comprising: a non-transitory computer readable storage medium that includes computer program instructions that when executed by a processor cause the processor to:
  store a boot sequence table in the storage unit, wherein the boot sequence table includes a specific boot sequence defining a boot sequence of the setup utility and the bootable subject during booting;
  start a setup utility in response to the determining that the subject to be booted, in accordance with the boot sequence, is the setup utility;
  start a setup utility timer value countdown from a specific value; and
  determining whether an input is received from a human interface apparatus before the setup utility value completes the countdown;
  if no input is received from the human interface apparatus before the setup utility value completes the countdown, restart the setup utility; and
  if an input is received from the human interface apparatus before the setup utility value completes the countdown, keep the information processing system idle and waiting for an additional input from the human interface apparatus.

* * * * *